(12) United States Patent
Tilloy et al.

(10) Patent No.: US 10,837,530 B2
(45) Date of Patent: Nov. 17, 2020

(54) ACTUATOR OF AN AIRCRAFT WITH AN ENERGY-ABSORBING LIMIT STOP WITH A DESTRUCTIBLE AND DETACHABLE BEARING SURFACE

(71) Applicant: RATIER FIGEAC, Figeac (FR)

(72) Inventors: Nicolas Tilloy, Figeac (FR); Olivier Brucelle, Villeneuve (FR)

(73) Assignee: RATIER FIGEAC, Figeac (FR)

( * ) Notice: Subject to any disclaimer, the term of this patent is extended or adjusted under 35 U.S.C. 154(b) by 644 days.

(21) Appl. No.: 15/367,286

(22) Filed: Dec. 2, 2016

(65) Prior Publication Data

US 2017/0158313 A1 Jun. 8, 2017

(30) Foreign Application Priority Data

Dec. 4, 2015 (FR) ...................... 15 61882

(51) Int. Cl.
*B64C 13/28* (2006.01)
*F16H 25/20* (2006.01)
*B64C 13/00* (2006.01)
*B64C 5/00* (2006.01)
*B64C 9/00* (2006.01)

(52) U.S. Cl.
CPC ........... *F16H 25/2015* (2013.01); *B64C 5/00* (2013.01); *B64C 9/00* (2013.01); *B64C 13/00* (2013.01); *B64C 13/28* (2013.01)

(58) Field of Classification Search
CPC .. F16H 25/20; F16H 25/2015; F16H 25/2021; F16H 25/2454; F16H 25/2472; B64C 13/00; B64C 13/28; B64C 9/00; B64C 5/10
See application file for complete search history.

(56) References Cited

U.S. PATENT DOCUMENTS

| 2,497,424 A | 2/1950 | Terdina et al. | |
| 3,732,744 A * | 5/1973 | Rowland | F16H 25/2015 74/89.37 |
| 5,088,339 A * | 2/1992 | Lochmoeller | F16H 25/2015 192/141 |

(Continued)

FOREIGN PATENT DOCUMENTS

| EP | 0 993 904 A2 | 4/2000 |
| EP | 2 302 262 A2 | 3/2011 |

(Continued)

OTHER PUBLICATIONS

French Search Report, dated Aug. 16, 2016, from corresponding French Search Report.

*Primary Examiner* — Richard R. Green
*Assistant Examiner* — Michael A. Fabula
(74) *Attorney, Agent, or Firm* — IPSILON USA, LLP (57) ABSTRACT

An actuator of an aircraft includes at least one limit stop in which at least one of the bearing surfaces, named destructible bearing surface (19), has at least one destructible portion which is able to, and is arranged to, be irreversibly deformed under the effect of the co-operation by limit contact between the driving member bearing surface (19) and the driven member bearing surface (20). Each destructible portion of each destructible bearing surface is mounted to be removable with respect to the stop as to be able to be replaced.

21 Claims, 6 Drawing Sheets

(56) References Cited

U.S. PATENT DOCUMENTS

| | | | | |
|---|---|---|---|---|
| 5,467,661 A | * | 11/1995 | Lange | F16H 25/2204 |
| | | | | 74/424.82 |
| 6,490,942 B1 | * | 12/2002 | Meyer | B60N 2/1615 |
| | | | | 297/344.14 |
| 6,672,540 B1 | * | 1/2004 | Shaheen | B64C 13/28 |
| | | | | 244/87 |
| 6,851,648 B2 | * | 2/2005 | Perni | B64C 13/28 |
| | | | | 244/99.3 |
| 9,016,152 B2 | * | 4/2015 | Jones | B64C 13/28 |
| | | | | 74/89.35 |
| 9,103,422 B2 | * | 8/2015 | Wingett | F16H 25/2015 |
| 9,182,022 B2 | * | 11/2015 | Wingett | F16H 25/2015 |
| 10,040,539 B2 | * | 8/2018 | Antunes | F16H 25/205 |
| 2003/0029258 A1 | * | 2/2003 | Davies | B64C 9/02 |
| | | | | 74/89.26 |
| 2004/0012236 A1 | | 1/2004 | Mallard | |
| 2004/0200929 A1 | * | 10/2004 | Perni | B64C 13/28 |
| | | | | 244/99.11 |
| 2006/0144996 A1 | * | 7/2006 | Carl | B64C 5/10 |
| | | | | 244/99.2 |
| 2008/0196525 A1 | * | 8/2008 | Bohlen | F16H 25/2015 |
| | | | | 74/89.37 |
| 2016/0340026 A1 | * | 11/2016 | Antunes | F16H 25/205 |
| 2018/0194454 A1 | * | 7/2018 | Olson | B64C 13/28 |

FOREIGN PATENT DOCUMENTS

| | | |
|---|---|---|
| FR | 2 335 734 A1 | 7/1977 |
| FR | 2 465 930 A1 | 3/1981 |
| FR | 2 832 362 A1 | 5/2003 |

* cited by examiner

ACTUATOR OF AN AIRCRAFT WITH AN ENERGY-ABSORBING LIMIT STOP WITH A DESTRUCTIBLE AND DETACHABLE BEARING SURFACE

The invention relates to an actuator of an aircraft, in particular a control surface actuator—provided with at least one limit stop having braking energy absorption—in particular two limit stops having braking energy absorption. It also relates to an aircraft comprising at least one actuator—in particular at least one control surface actuator—provided with at least one limit stop having braking energy absorption—in particular two limit stops having braking energy absorption.

Known aircraft comprise various actuators, in particular with screws (ball screws, roller screws, screws with a trapezoidal screw pitch . . . ): for example control surface actuators, door actuators, landing gear actuators . . . . Such an actuator can be an hydro-mechanical, electromechanical, hydro-electromechanical, pneumatic actuator or one using any other source(s) of energy. It can be linear and/or rotary, using gears or not, . . . and comprises, in addition to a mechanical transmission, at least one motor device (electric motor (in particular for electromechanical actuators (EMA) such as those used in modern aircraft with electrical flight controls); and/or hydraulic motor; and/or pneumatic motor) coupled to the mechanical transmission for causing a driven member to move relative to the body of the aircraft. For reasons of safety, in particular, the known actuators, such as ball screws or roller screws, installed on an aircraft are generally provided with two limit stops limiting the movement stroke of the driven member, for example limiting the relative translational movement stroke of a nut with respect to a screw. Such known limit stops are advantageously provided with washers or elastic buffers for absorbing braking energy (cf. e.g. U.S. Pat. No. 2,497,424, EP2302262). In fact, the absorption of braking energy allows the protection of the actuator and the various members located upstream (in particular the motor device) or downstream (i.e. the member of the aircraft for which the movement is controlled by the actuator) from the shocks resulting from a limit contact of the stop. It may also allow this energy to be released for driving the actuator in the opposite direction after a limit contact.

Nevertheless, it proves to be the case that such elastic or rubber buffers have a relatively low energy absorption capacity, are prone to aging, are highly sensitive to environmental conditions (variations in temperature, humidity, solvents, fluids . . . ) and have characteristics which may be changed after one (or more) limit contact(s) of the stop. However, degraded characteristics of such a limit stop can result, upon limit contact, in deteriorations of the actuator and/or of the motor device of the actuator and/or of a member of the aircraft, such as a control surface, for which the movement is controlled by the actuator. Furthermore, in aeronautics, it is important that such parts can be certified as to their performance and characteristics.

The invention thus aims generally to solve this problem by proposing a limit stop for an actuator—in particular for a screw actuator—of an aircraft having a higher limit braking energy absorption capacity, and of which the characteristics can be predetermined (and certified), remain constant over a longer service life, and are independent of the various environmental conditions to which the actuator is subjected during its use on the aircraft.

Throughout the text, the term first member "fixedly attached" to a second member means that the positions of the first member and the second member are simultaneously unchanged or simultaneously modified and by the same magnitude. Therefore, the term first member "fixedly attached in translation" to a second member means that the positions at least in translation of the first member and the second member are simultaneously unchanged or simultaneously modified and by the same magnitude. Similarly, the term first member "fixedly attached in rotation" to a second member means that the positions at least in rotation of the first member and the second member are simultaneously unchanged or simultaneously modified and by the same magnitude.

To this end, the invention relates to an actuator of an aircraft—in particular a control surface actuator—comprising a driving member and a driven member co-operating to form a guide for relative helical movement about an axis of the driven member with respect to the driving member, said actuator being provided with at least one limit stop having braking energy absorption comprising at least one driving member bearing surface fixedly attached to the driving member in at least one rotational component of said relative movement (i.e. the driving member bearing surface is fixedly attached at least in rotation to the driving member), and at least one driven member bearing surface fixedly attached to the driven member in at least one rotational component of said relative movement (i.e. the driven member bearing surface is fixedly attached at least in rotation to the driven member), said driving member and driven member bearing surfaces being arranged to be able to co-operate by limit contact to form a device limiting the stroke of the driven member with respect to the driving member with braking energy absorption, each driven member bearing surface co-operating by contact with a driving member bearing surface in at least one radial contact plane, characterized in that:

at least one limit stop:
  comprises at least one destructible portion which is able to, and is arranged to, be irreversibly deformed under the effect of the co-operation by limit contact of said driving member and driven member bearing surfaces, by relative rotation at the limit of said driving member and driven member bearing surfaces,
  is adapted such that the destruction of at least one destructible portion is visible from the outside,
  each destructible portion is mounted to be removable relative to the actuator—in particular relative to the stop—so as to be able to be replaced.

More particularly, the invention relates to an actuator of an aircraft—in particular a control surface actuator—named screw actuator, comprising a screw and a nut co-operating (in particular via a guide device selected from among balls, rollers and trapezoidal screw pitches) to form a guide for relative rotation and translation of the nut along the screw, said screw actuator being provided with at least one limit stop having braking energy absorption comprising at least one screw bearing surface fixedly attached to the screw in at least one rotational component of said relative movement (i.e. the screw bearing surface is fixedly attached at least in rotation to the screw), and at least one nut bearing surface fixedly attached to the nut in at least one rotational component of said relative movement (i.e. the nut bearing surface is fixedly attached at least in rotation to the nut), said screw and nut bearing surfaces being arranged to be able to co-operate by limit contact to form a device limiting the stroke of the nut with respect to the screw with braking energy absorption, each nut bearing surface co-operating by contact with a screw bearing surface in at least one radial contact plane, characterized in that:

at least one limit stop:

comprises at least one destructible portion which is able to, and is arranged to, be irreversibly deformed under the effect of the co-operation by limit contact of said screw and nut bearing surfaces, by relative rotation at the limit of said screw and nut bearing surfaces, is adapted such that the destruction of at least one destructible portion is visible from the outside, each destructible portion is mounted to be removable relative to the actuator—in particular relative to the stop—so as to be able to be replaced.

Whilst a destructible portion which is removable, i.e. detachable, could be considered to have irredeemable disadvantages relative to washers or elastic buffers, the inventors have, on the contrary, determined that such a destructible portion in fact has major advantages for a limit stop of an actuator of an aircraft.

Firstly, irreversible deformation (plastic deformation and/or breaking), i.e. destruction, of a destructible portion causes a high dissipation of energy and has a braking energy absorption capacity much higher than elastic (i.e. reversible) deformation.

Furthermore, a destructible portion can be formed of a rigid material with low elasticity, having mechanical characteristics which are constant over time and are have little sensitivity to aging and to environmental conditions.

Furthermore, and above all, a limit stop of an actuator of an aircraft is a safety member which, under normal usage conditions of the aircraft, will never be used. In particular, the bearing surfaces of such a limit stop of an actuator of an aircraft will never come into limit contact whilst the aircraft is in flight. In fact, an actuator installed on an aircraft is always sized such that the positions of the driven member corresponding to the limit stops can never be reached whilst the aircraft is in flight. Consequently, these limit stops are mainly used when the aircraft is on the ground, during construction or maintenance operations. In particular, they make it possible to avoid inappropriate movements of the members for which the movement is controlled by the actuator which could result in mounting errors or setting errors and would be likely to cause deterioration or breakage. However, in this context, not only does a destructible bearing surface make it possible to avoid said deterioration or breakage but it also has the decisive advantage of being able to be designed such that the destruction of at least one destructible portion is visible from the outside, or provided with a device for showing such destruction. Taking into account the rarity of accidental abutments of these limit stops, the fact of having to detach and replace a limit stop having been destroyed does not represent an actual disadvantage.

An actuator comprises two members which can move relative to each other: for example the screw and the nut in the case of a screw actuator such as a ball screw or roller screw or screw with a trapezoidal screw pitch. One of these movable members is a driving member, caused to rotate by a motor device to which it is coupled and fixed (in particular in translation) with respect to the body of the aircraft, and the other movable member is a driven member which is movable (in particular in translation) with respect to the body of the aircraft.

Advantageously and in accordance with the invention, at least one of said driven member and driving member bearing surfaces is a destructible bearing surface comprising at least one destructible portion. A limit stop of an actuator of an aircraft in accordance with the invention can comprise one or more destructible bearing surface(s)—in particular several destructible bearing surfaces fixedly attached to the same movable member and/or fixedly attached to the two movable members. Furthermore, the same destructible bearing surface (in particular screw bearing surface or nut bearing surface) of a limit stop of the invention can comprise one or more destructible portion(s).

In an limit stop of an actuator of an aircraft in accordance with the invention, at least one destructible portion is mounted to be removable with respect to the actuator and with respect to the stop, i.e. it can be detached so as to be able to be replaced. Such a removable portion can be removed in isolation or as one piece with a set of parts in which it is integrated, said set itself being mounted to be removable with respect to the actuator. Therefore, at least one destructible portion is mounted to be removable with respect to the driving member and/or with respect to the bearing surface of the driving member and/or with respect to the driven member and/or with respect to the bearing surface of the driven member and/or with respect to the screw bearing surface and/or with respect to the nut bearing surface.

In particular, advantageously and in accordance with the invention, at least one driving member bearing surface is a destructible bearing surface comprising at least one destructible portion which is removable with respect to the driving member bearing surface. As a variant or in combination, advantageously and in accordance with the invention, at least one driven member bearing surface is a destructible bearing surface comprising at least one destructible portion which is removable with respect to the driven member bearing surface.

Likewise, in a limit stop of an actuator of an aircraft in accordance with the invention, at least one destructible bearing surface is mounted fixedly attached to the driving member and/or at least one destructible bearing surface is mounted fixedly attached to the driven member and/or at least one destructible bearing surface is mounted fixedly attached to the nut and/or at least one destructible bearing surface is mounted fixedly attached to the screw, this destructible bearing surface being mounted to be removable with respect to the driving member and/or the driven member and/or the nut and/or the screw respectively.

In particular, advantageously and in accordance with the invention, at least one driving member bearing surface is a destructible bearing surface mounted to be removable with respect to the driving member. As a variant or in combination, advantageously and in accordance with the invention, at least one driven member bearing surface is a destructible bearing surface mounted to be removable with respect to the driven member.

Furthermore, in certain advantageous embodiments, a destructible portion of a limit stop of an actuator of an aircraft in accordance with the invention can be adapted to be plastically deformed under the effect of the co-operation by limit contact between said driving member and driven member bearing surfaces. For example, such a destructible portion can be formed of at least one block of material adapted to undergo a plastic deformation under the effect of stresses resulting from limit contact and impact between the driving member and driven member bearing surfaces. Such a block of material with plastic deformation can be incorporated in said destructible bearing surface, mounted to be removable in the latter to be able to be detached and replaced by a new block.

As a variant or in combination, in certain advantageous embodiments of a limit stop of an actuator of an aircraft in accordance with the invention, at least one destructible portion is adapted to be broken under the effect during the co-operation by limit contact between the driving member and driven member bearing surfaces.

A destructible portion able to be broken of a limit stop of an actuator of an aircraft in accordance with the invention can be broken in any manner: cutting, punching, shearing, penetration, deformation to breaking point under torsion and/or compression and/or bending and/or traction . . . . This destructible portion is able to be broken by at least one member fixedly attached to another bearing surface. In certain advantageous embodiments of the invention, at least one destructible bearing surface comprises at least one destructible portion adapted to be cut by at least one cutter fixedly attached to another bearing surface under the effect of a relative movement of the driven member with respect to the driving member and between these bearing surfaces upon co-operation by limit contact between the driving member and driven member bearing surfaces.

It should be noted in this respect that the energy absorbed by breaking a destructible portion is, for a given abutment force, much higher than that absorbed by a plastic deformation.

In certain embodiments of an actuator of an aircraft in accordance with the invention, the co-operation by contact between the driving member bearing surface and the driven member bearing surface is effected by relative movement by rotation, and preferably by rotation and translation, of these two bearing surfaces with respect to each other.

In fact, the invention relates to an actuator of an aircraft in which the driving member and the driven member of the actuator are guided in a helical movement about an axis. It can be in particular a screw actuator, in particular a screw actuator such as a ball screw, roller screw, a screw with a trapezoidal screw pitch . . . .

Furthermore, in certain embodiments in accordance with the invention, at least one—in particular each—driving member bearing surface is also fixedly attached to the driving member in at least one translational component of said relative movement (i.e. the driving member bearing surface is also fixedly attached in translation to the driving member) and at least one—in particular each—driven member bearing surface is also fixedly attached to the driven member in at least one translational component of said relative movement (i.e. the driven member bearing surface is also fixedly attached in translation to the driven member).

That being said, there is nothing to prevent, as a variant, provision being made that at least one of these bearing surfaces is not fixedly attached in translation to the corresponding member, the translational position along the axis of said helical movement of this bearing surface being able to be determined in any other manner, i.e. by an independent mechanism (fork, spring . . . ). For example, the screw bearing surface can be guided by only grooves along the screw without being prevented from moving in translation with respect to the screw.

Advantageously and in accordance with the invention, each driven member bearing surface co-operates by contact with a driving member bearing surface in at least one radial contact plane, preferably in a plurality of contact planes uniformly distributed about the helical movement axis.

In certain possible embodiments, at least one destructible portion can be mounted fixedly attached to a first driving member or driven member bearing surface and arranged to be able to be directly impacted by a second driving member or driven member bearing surface, respectively, i.e. by being directly interposed between the first bearing surface and the second bearing surface at the limit. Such a destructible portion added to said first bearing surface is assembled to be removable on this first bearing surface so as to be able to be replaced.

In other advantageous embodiments, at least one—in particular each—driving member or driven member bearing surface, named destructible bearing surface, comprising at least one destructible portion, comprises an impact frame arranged to receive at the limit the impact of the other bearing surface, of the driven member or of the driving member, this impact frame being arranged to be able to:

be caused to move with respect to each destructible portion under the effect of said impact and of the co-operation by limit contact of said driving member and driven member bearing surfaces, cause the irreversible deformation of each destructible portion under the effect of said movement.

Furthermore, in certain advantageous embodiments, a limit stop of an actuator of an aircraft in accordance with the invention is adapted so that the destruction of at least one—in particular each—destructible portion is visible.

To this end, in accordance with a first variant of the invention, said destructible portion is advantageously positioned so as to be visible from the exterior of the stop and of the actuator. This first variant is particularly advantageous in the case of a destructible portion which is able to be broken, a break generally being rendered visible immediately, e.g. in the form of a shearing chip.

In accordance with a second possible variant of the invention, the stop comprises a device indicating the deformation of at least one—in particular each—destructible portion. This second variant is particularly advantageous in the case of a destructible portion adapted to be plastically deformed.

An actuator of an aircraft in accordance with the invention further comprises at least one motor device coupled to one of the movable members, the driving member—in particular selected from among the screw and the nut of a screw actuator—of the actuator for causing it to move—in particular in rotation. This motor device comprises at least one motor selected from among an electric motor, a hydraulic motor and a pneumatic motor. The other movable member of the actuator is a driven member coupled to a movable part of the aircraft—in particular a control surface, e.g. an elevator—for causing it to move.

The invention also relates to an aircraft comprising at least one actuator—in particular at least one control surface actuator, e.g. an elevator actuator—provided with at least one limit stop having braking energy absorption, characterised in that it comprises at least one actuator—in particular at least one control surface actuator—in accordance with the invention.

The invention also relates to an actuator of an aircraft and an aircraft which are characterised in combination by all or some of the features mentioned above or below.

Other aims, features and advantages of the invention will become apparent upon reading the following description given by way of non-limiting example and which makes reference to the attached figures in which.

Figure 1:
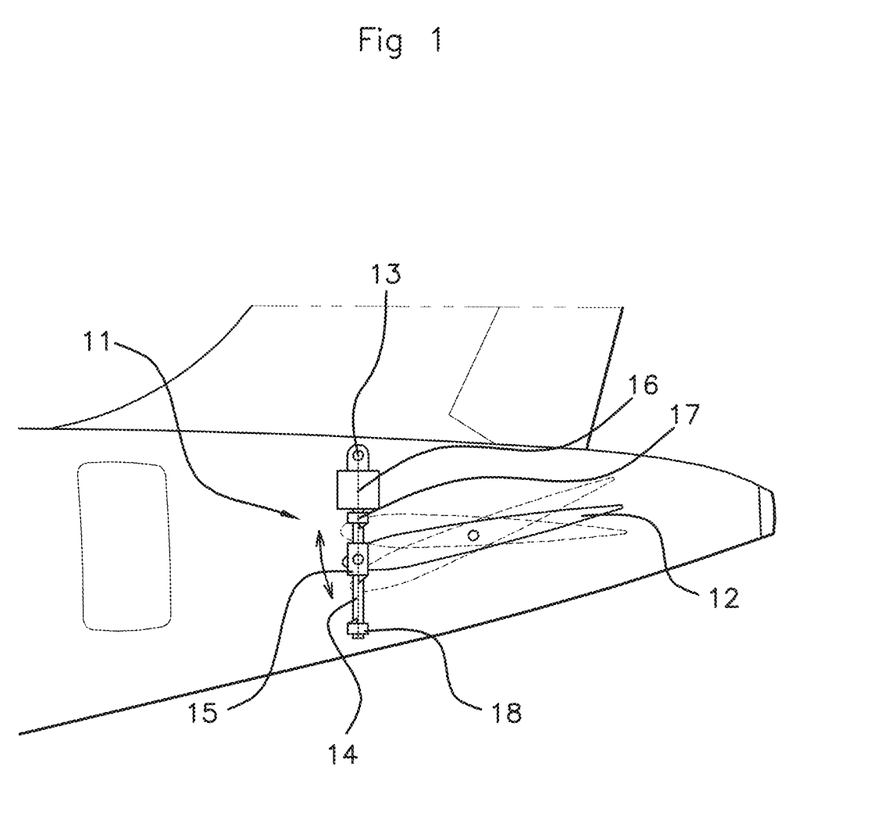
FIG. 1 is a partial elevational schematic view illustrating a tail portion of an aircraft in accordance with the invention provided with an adjustable actuator in accordance with the invention having an actuator provided with limit stops in accordance with the invention.

In the example shown in FIG. 1, an aircraft in accordance with the invention comprises an adjustable actuator 11 allowing the tilting of the elevator 12 of the aircraft to be controlled. The actuator 11 is articulated at its upper end to the body of the aircraft about a transverse horizontal axis by way of a hinge 13. It comprises a transmission comprising a ball screw formed of an endless screw 14 and a nut 15. The endless screw 14 is caused to rotate at its upper end by a geared motor device 16 comprising for example an electric and/or hydraulic motor. The endless screw 14 is articulated at least in a pivot connection (which can incorporate a gimbal function having several degrees of freedom) by its upper end and fixed in translation with respect to the body of the aircraft. The endless screw 14 co-operates with the nut 15 via a recirculation ball device such that the nut 15 is driven in translation along the endless screw 14 when the latter is caused to rotate in the nut 15. The nut 15 is coupled in an articulated manner at least in a pivot connection (which can incorporate a gimbal function having several degrees of freedom) to the elevator 12 such that the translational position of the nut 15 along the endless screw 14 determines the tilt of this elevator 12. The articulation of the nut 15 to the elevator 12 prevents any rotation of the nut 15 about the axis of the endless screw 14. The pivot connection of this articulation of the nut 15 to the elevator 12 and the pivot connection of the articulation of the endless screw 14 to the body of the apparatus are pivot connections on parallel axes which are also in parallel with the axis for transverse pivoting of the elevator 12 of the apparatus with respect to the body.

The actuator 11 comprises an upper limit stop 17 and a lower limit stop 18.

Each of the limit stops 17, 18 in accordance with the invention comprises at least one screw bearing surface 19 fixedly attached at least in translation to the endless screw 14 and at least one nut bearing surface 20 fixedly attached at least in translation to the nut 15, and at least one destructible portion which is adapted to be irreversibly deformed by plastic deformation and/or breaking under the effect of the co-operation by limit contact of said screw bearing surface 19 and nut bearing surface 20.

Figure 2:
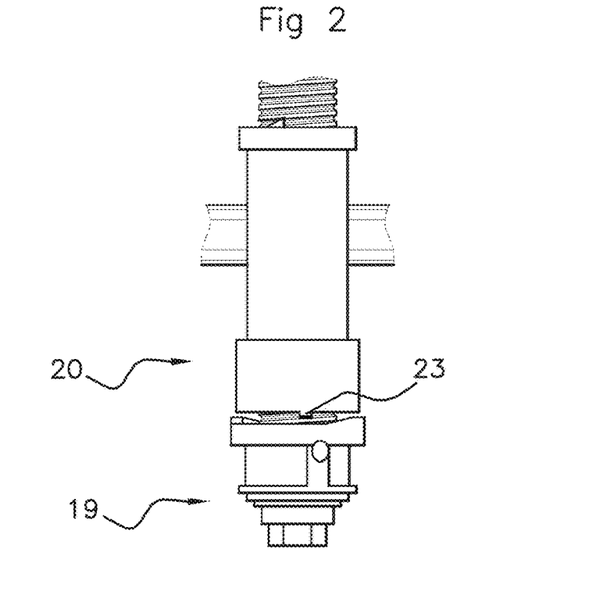
FIG. 2 is an elevational schematic view of an actuator provided with a limit stop in accordance with the invention.
Figure 3:
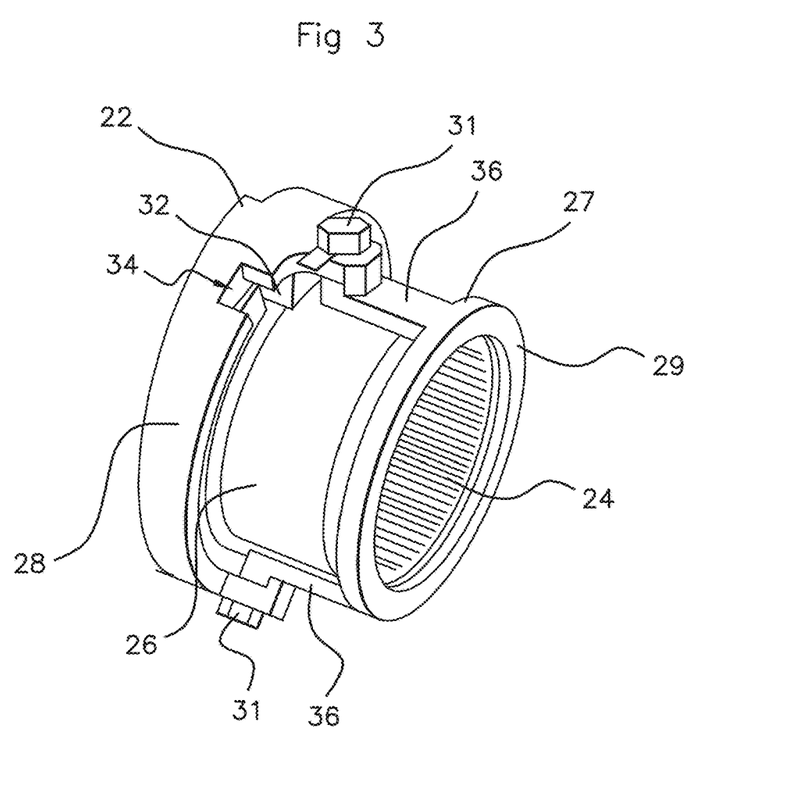
FIG. 3 is a perspective schematic view of a screw bearing surface of a limit stop in accordance with a first embodiment of the invention comprising destructible portions able to be broken, the screw bearing surface being shown prior to deformation and breaking of the destructible portions.
Figure 4:
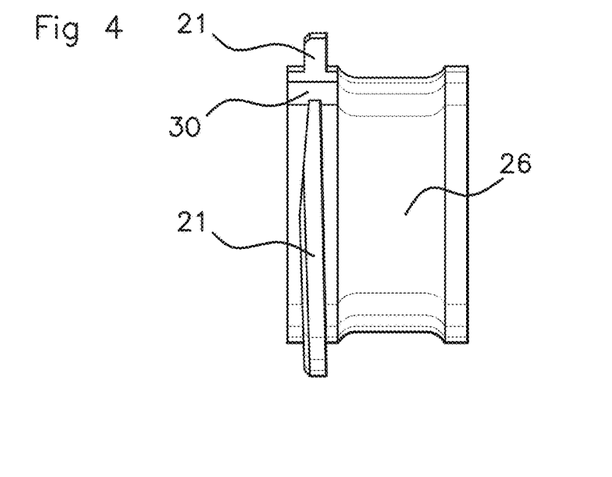
FIG. 4 is an elevational schematic view of an inner frame with destructible portions of the screw bearing surface of the limit stop of FIG. 3.
Figure 5:
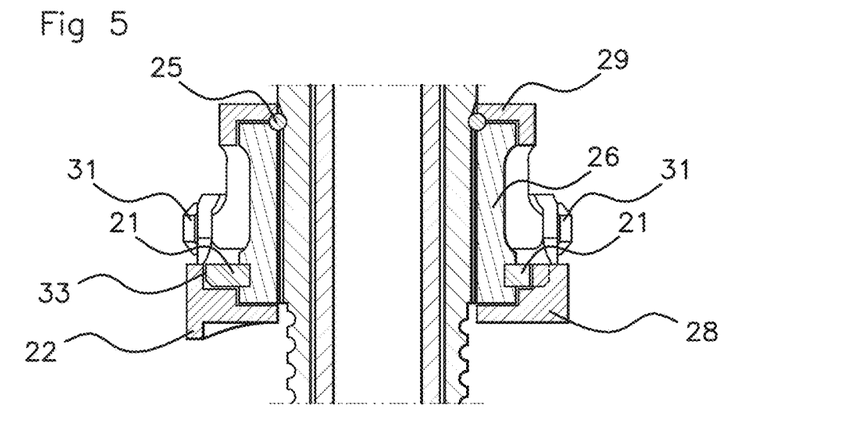
FIG. 5 is an axial sectional schematic view of the screw bearing surface of the limit stop of FIG. 3.
Figure 6:
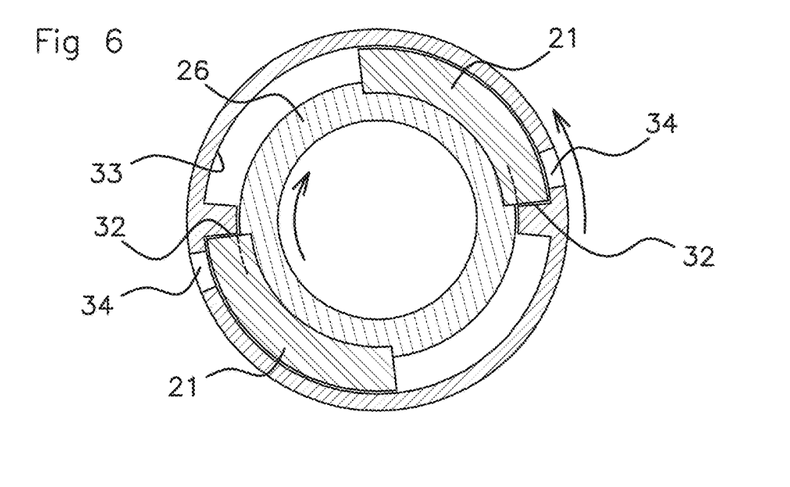
FIG. 6 is a transverse sectional schematic view of the screw bearing surface of the limit stop of FIG. 3.

FIG. 2 shows one possible embodiment of a lower limit stop 18 comprising a screw bearing surface 19 fixedly attached in translation and rotation to the endless screw 14 and a nut bearing surface 20 fixedly attached in translation and rotation to the nut 15. The screw bearing surface 19 is generally sleeve-shaped engaged at the end of the endless screw 14, prevented from rotating with respect to the latter by wedging or by conjugated grooves 24 of the screw bearing surface 19 and the endless screw 14 or by any other rotation-preventing means. The screw bearing surface 19 is also fixed in translation with respect to the endless screw 14. The nut bearing surface 20 can be formed by a specific part fitted on the nut 15 or simply by a transverse surface of the nut 15.

Furthermore, these two bearing surfaces, the screw bearing surface 19 and nut bearing surface 20, have claw coupling members 22, 23 of the type named "crocodile teeth" or "gullet teeth", having complementary shapes and forming a rotational coupling of these bearing surfaces at the limit of translation.

In the position shown in FIG. 2, the nut 15 is at the limit of translation along the endless screw 14 and the nut bearing surface 20 comes to co-operate by limit contact with the screw bearing surface 19. The nut bearing surface 20 comes to abut in translation and in rotation against the screw bearing surface 19 and the claw coupling members 22 of the screw bearing surface 19 come to impact the claw coupling members 23 of the nut bearing surface 20 forming said rotational coupling. Nevertheless, since the nut bearing surface 20 is prevented from rotating, with respect to the body of the aircraft, about the rotational axis of the endless screw 14, this rotational coupling causes a rotational shock with a resistant torque and rotational stresses within the screw bearing surface 19 between the claw coupling members 22 and the rotation-preventing grooves 24 of the screw bearing surface 19 with respect to the endless screw 14.

Preferably, these claw coupling members 22, 23 are arranged so as to have at least one contact plane (between the crocodile teeth of the nut bearing surface and those of the screw bearing surface) which is radial and remains perpendicular to the relative rotational movement between the two bearing surfaces. In this manner, upon impact a stop is achieved without progressive wedging after impact, a certain reverse backwards movement remaining possible.

Another advantage of providing each radial contact plane which remains perpendicular to the relative rotational movement is that the axial component of the force generated upon impact is zero or is negligible.

Furthermore, advantageously, the screw bearing surface 19 and nut bearing surface 20 each comprise a plurality of claw coupling members 22, 23, and the claw coupling members 22, 23 and thus also the different corresponding contact planes are uniformly distributed about the axis of the endless screw 14. In this manner, any shear force component is avoided. In the illustrated example, the screw bearing surface 19 comprises two diametrically opposed claw coupling teeth 22 and the nut bearing surface 20 comprises two diametrically opposed claw coupling teeth 23.

In the first embodiment of FIGS. 3 to 7, the screw bearing surface 19 comprises portions 21 which are destructible by breaking by shearing causing a dissipation of impact energy at the limit and thus an absorption of movement braking energy at the limit.

To this end, the screw bearing surface 19 comprises an inner frame 26 having grooves 24 preventing rotation with respect to the endless screw 14 and an outer impact frame 27 surrounding the inner frame 26, guided in rotation with respect to the latter about the rotational axis of the endless screw 14 and having the claw coupling members 22. The destructible portions 21 are interposed between these two frames 26, 27 which are further adapted such that a rotational movement of the outer frame 27 about the inner frame 26 causes breaking of these destructible portions 21.

In the illustrated embodiment, the destructible portions 21 are formed by peripheral destructible ribs 21—in particular, in the illustrated example, two peripheral destructible ribs 21 angularly spaced apart from each other—protruding radially to the outside (collar portion) of a cylindrical peripheral wall 30—permitting revolution—of the axial end of the inner frame 26 facing the nut 15.

The outer impact frame 27 is formed of two rings 28, 29 which come to respectively cover the two axial ends of the sleeve forming the inner frame 26 and fitted to each other by screws 31. A first ring 28, named shearing ring 28, covers the axial end of the inner frame facing the nut bearing surface 20 and has two diametrically opposed claw coupling teeth 22 protruding in an axial direction (in parallel with the axis of the screw 14) towards the nut bearing surface 20, these claw coupling teeth 22 being adapted to co-operate with two diametrically opposed claw coupling teeth 23 of the nut bearing surface 20 protruding in an axial direction towards the screw bearing surface 19.

The second ring, named holding ring 29, covers the axial end of the inner frame 26 facing the end of the endless screw 14. The holding ring 29 has tabs 36 extending in an axial direction to the outside of the inner frame 26, uniformly angularly distributed about the latter, for fitting the holding ring 29 to the shearing ring 28 by screws 31 screwed into conjugated threads of the tabs 36. The respective shapes and dimensions of the rings 28, 29 of the outer frame 27 and of the inner frame 26, as well as the fitting of the two rings 28, 29 to each other are adapted to allow rotational guiding of the outer frame 27 about the inner frame 26 on a rotational axis corresponding to the rotational axis of the endless screw 14. The holding ring 29 and the inner frame 26 are prevented from translational movement with respect to the endless screw 14 by an elastic split stop O-ring 25 engaged in a peripheral recess of the end of the endless screw 14 and in recesses of the inner frame 26 and of the holding ring 29.

The shearing ring 28 also has an inner cylindrical surface 33 extending about destructible ribs 21, and shearing cutters 32 protruding radially towards the interior of the inner cylindrical surface 33, between the destructible ribs 21 so as to be able to shear the latter when the outer frame 27 is caused to rotate about the inner frame 26. In the illustrated example, the shearing ring 28 has two shearing cutters 32.

Figure 7:
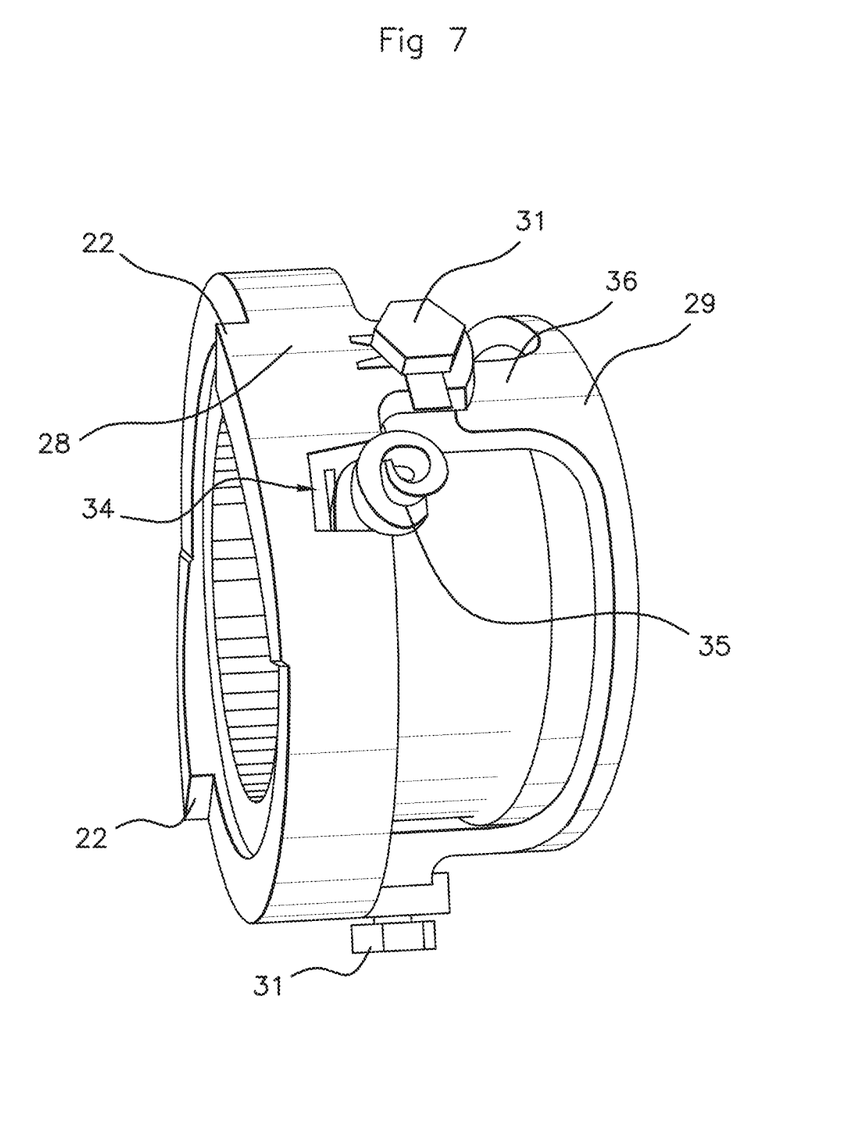
FIG. 7 is a perspective schematic view of the screw bearing surface of the limit stop of FIG. 3, shown after deformation and breaking of the destructible portions.

Furthermore, the shearing ring 28 advantageously has a lumen 34 provided immediately upstream of each shearing cutter 32 allowing the release radially towards the outside of the chip 35 resulting from the shearing of the destructible rib 21 by the shearing cutter 32. As shown in FIG. 7, this chip 35 wraps around itself and exits the lumen 34 thus making it apparent that the destructible rib 21 has been shorn.

The respective constituent materials of the shearing cutters 32 and the destructible ribs 21 are selected so as to facilitate the shearing of each destructible rib 21 by a shearing cutter 32. For example, the shearing ring 28 can be formed of rigid steel whilst the destructible ribs 21 are formed of aluminium alloy. Furthermore, advantageously, the end portion of each destructible rib 21 on the shearing cutter 32 side is bevelled in width such that the end impacted by the shearing cutter 32 has a reduced width facilitating the start of this shearing.

The destructible ribs 21 can be packing elements added to the inner frame 26 and mounted to be removable with respect to the latter so as to be able to be replaced after destruction. As a variant, the destructible ribs 21 can be formed by the inner frame 26 itself (in a single piece), this inner frame 26 being mounted to be removable with respect to the endless screw 14 owing to the detachable elastic split stop ring 25 in the manner of a circlip. In this latter variant, it is possible to replace the entire screw bearing surface 19 or, on the contrary, only the inner frame 26 which is detachable with respect to the outer frame 27 by screws 31.

It should be noted that, as a variant which is not illustrated, the nut bearing surface 20 can be formed as a destructible bearing surface in a manner similar to the screw bearing surface 19 described above. It suffices for this purpose for provision to be made that the inner frame is fixedly attached in rotation and translation to the nut 15.

Figure 8:
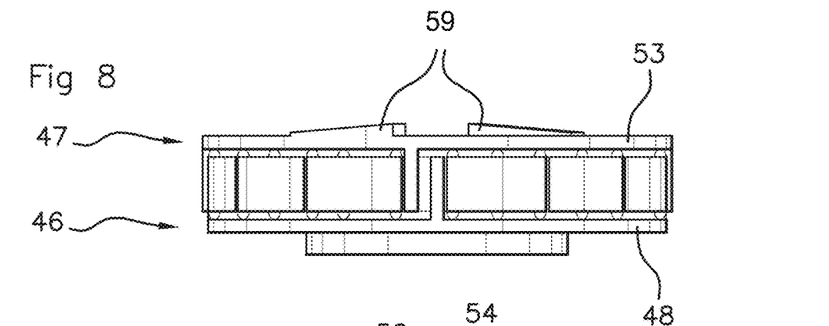
FIG. 8 is an elevational schematic view of a screw bearing surface of a limit stop in accordance with a second embodiment of the invention comprising destructible portions with plastic deformation.
Figure 9:
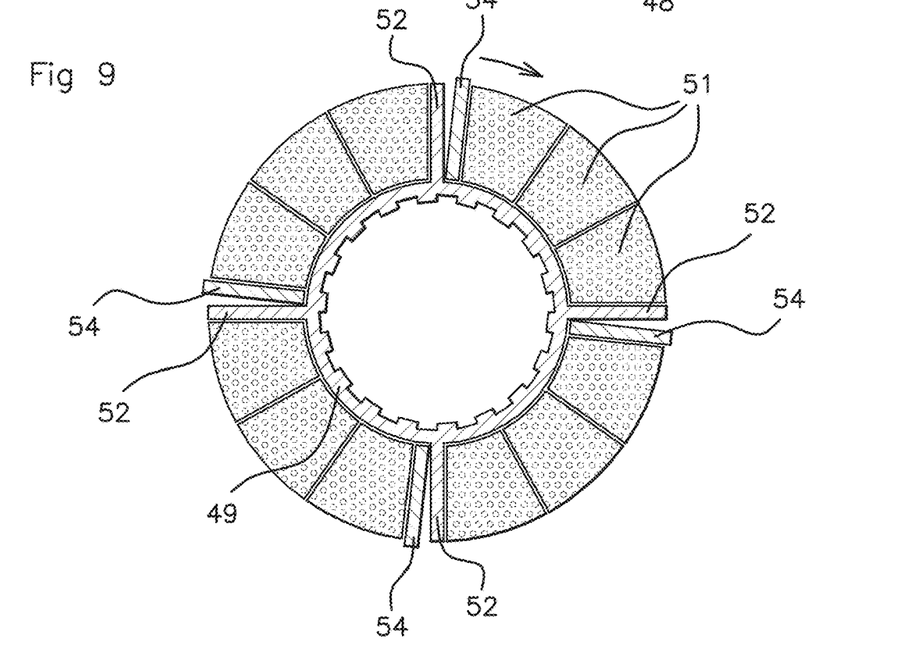
FIG. 9 is a transverse sectional schematic view of the screw bearing surface of the limit stop of FIG. 8.
Figure 10:
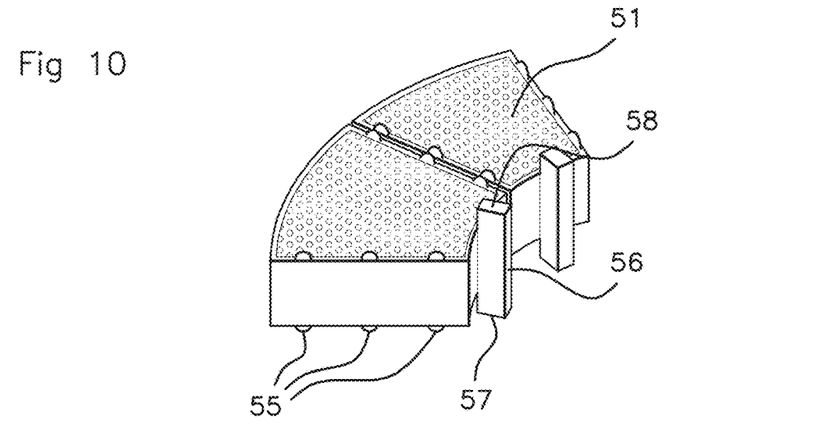
FIG. 10 is a partial perspective schematic view of destructible portions of the screw bearing surface of the limit stop of FIG. 8.

In the second embodiment illustrated in FIGS. 8 to 10, the destructible bearing surface comprises an inner frame 46 comprising a transverse crown 48 axially extended by a generally cylindrical sleeve 49 which is prevented from rotating with respect to the endless screw 14 by wedging or grooves or by any other rotation-preventing means. The sleeve 49 has an outer diameter smaller than that of the crown 48. The inner frame 46 also has radial wings 52 extending radially towards the outside from the sleeve 49 to the peripheral edge of the crown 48 and in parallel with the axis of the sleeve 49 over a certain height. The radial wings 52 are uniformly angularly distributed so as to delimit therebetween angular sectors of the crown 48 adapted to accommodate destructible packing elements 51.

The destructible bearing surface also comprises an outer impact frame 47 comprising a transverse crown 53 and radial wings 54 extending radially to the peripheral edge of the crown 53 and in parallel with the axis of the crown 53 over a height corresponding to that of the radial wings 52 of the inner frame 46. The radial wings 54 are uniformly angularly distributed so as to delimit therebetween angular sectors of the crown 53 which are adapted to accommodate the destructible packing elements 51. The crown 53 of the outer impact frame 47 also has claw coupling teeth 59 protruding in parallel with the axis from the outer surface opposite the wings 54.

The crown 48 of the inner frame 46 and the crown 53 of the outer frame 47 have similar dimensions and the radial wings 54 of the outer frame 47 are interposed between the radial wings 52 of the inner frame 46, each radial wing 54 of the outer frame 47 being placed against a radial wing 52 of the outer frame 46. A set of destructible packing elements 51 is housed between each radial wing 54 of the outer frame 47 and a radial wing 52 of the inner frame 46, and between the two crowns 48, 53.

Each destructible packing element 51 is formed of a block of material with plastic deformation, at least in angular compression. This block is in the form of an angular sector with a height slightly less than that of the wings 52, 54 and advantageously has axially spaced apart bosses 55 which allow axial clearance to be provided between each destructible packing element 51 and each crown 48, 53 for the circulation and drainage of water. Preferably, each block likewise has a strip 56 forming the inner radial end of the block and extending in parallel with the axis of the two crowns 48, 53 so as to form protruding locking stubs 57, 58, each locking stub 57, 58 able to be engaged in a recess (not shown in the figures) hollowed into the facing crown 48, 53.

Such a destructible bearing surface is assembled by placing destructible packing elements 51 between the wings of one of the crowns 48, 53 then by placing the other crown 53, 48 to cover these destructible packing elements 51 and lock them in place owing to the stubs 57, 58 by axially bringing together the two crowns 48, 53.

At the limit of the nut 15 with respect to the endless screw 14, the claw coupling teeth of the outer impact frame 47 are impacted by the claw coupling teeth of the other bearing surface of the limit stop, and the outer frame 47 is caused to rotate with respect to the inner frame 46, each radial wing 54 of the outer frame 47 angularly compressing the destructible packing elements 51 interposed between this radial wing 54 and a radial wing 52 of the inner frame 46. In so doing, the destructible packing elements 51 undergo plastic deformation with energy being dissipated. It is possible to change the destructible packing elements 51 after deformation by axially separating the two crowns 48, 53 from each other and by replacing the packing elements with new destructible packing elements 51 between the two crowns 48, 53.

It is possible to provide (in a variant which is not shown) a visible marking on the periphery of the outer frame 47 coming to face a scale or coloured zones on the periphery of the inner frame 46, allowing the fact that the outer frame 47 has been angularly moved with respect to the outer frame 46 to be seen, forming an indicator of the destruction of the destructible packing elements 51, requiring their replacement.

The material with plastic deformation forming each destructible packing element 51 can be any material so long as it is able to be deformed plastically under the effect of the impact torque generated at the limit of the nut 15 with respect to the endless screw 14. It can be in particular a material selected from a rigid (open-cell or closed-cell) polymeric foam, a rigid mesh structure (of a material selected from rigid metal alloys and rigid polymeric materials), e.g. in honeycombs, or the like. In particular, such a rigid mesh structure can be obtained by moulding or by additive manufacturing (three-dimensional printing).

Figure 11:
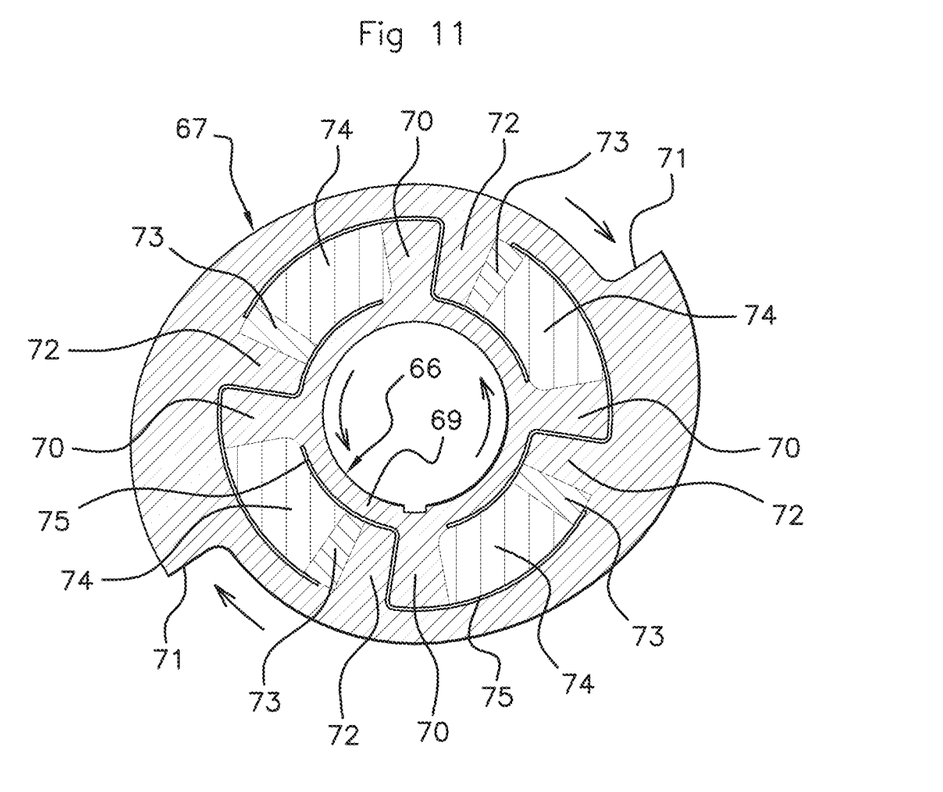
FIG. 11 is a transverse sectional schematic view of a screw bearing surface of a limit stop in accordance with a third embodiment of the invention comprising destructible portions with plastic deformation.
Figure 12:
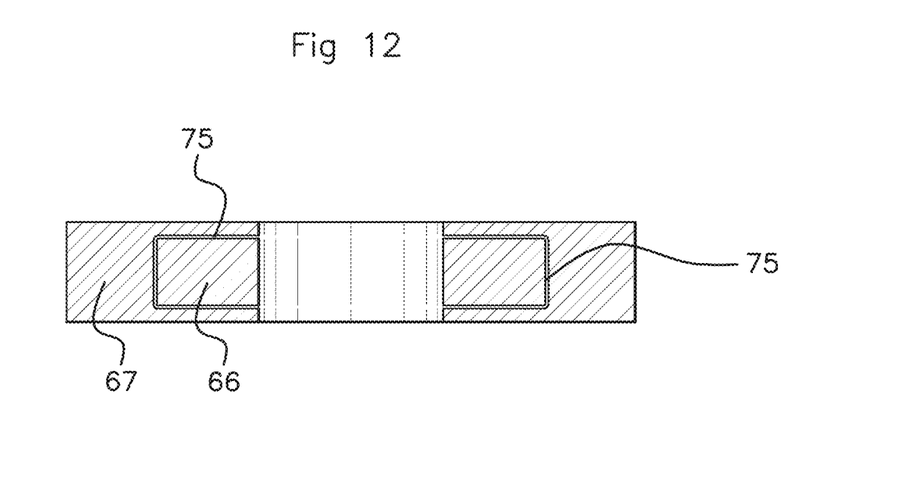
FIG. 12 is an axial sectional schematic view of the screw bearing surface of the limit stop of FIG. 11.

FIGS. 11 and 12 illustrate a third embodiment of a destructible bearing surface of a limit stop in accordance with the invention which is a variant of the second embodiment of FIGS. 8 to 10, in which the destructible bearing surface is formed in a single piece integrating the two frames, the inner frame and the outer frame, this piece having zones with different structural mesh densities so as to form destructible portions integrated within this piece. Such a piece can also be made by additive manufacturing (three-dimensional printing).

In the illustrated example, a first inner portion 66 with high mesh density serves as a rigid inner frame forming a central sleeve 69 and four radial wings 70 extending towards the outside of the central sleeve. A second outer portion 67 of high mesh density extends radially to the outside of the first portion 66 and serves as a rigid outer frame having radial peripheral claw coupling teeth 71 and four radial wings 72 extending inwardly, destructible portions 73, 74 of lower mesh density being angularly interposed between a radial wing 72 of the second outer portion 67 and a radial wing 70 of the first inner portion 66. In the illustrated example, a destructible portion 73 of average mesh density is joined to the radial wing 72 of the second outer portion 67 and a destructible portion 74 of low mesh density is angularly interposed between this destructible portion 73 of average mesh density and the radial wing 70 of the first inner portion 66. Cut-out zones 75 (free of material) are interposed between the destructible portions 73, 74 and the first and second inner 66 and outer 67 portions.

When an impact torque is applied to the claw coupling teeth 71 at the limit of the nut 15 with respect to the endless screw 14, each destructible portion 74 of low mesh density is firstly plastically deformed under the effect of the wings 72, 70 being brought together and then, if the impact energy is sufficiently high, each destructible portion 73 of average density is then plastically deformed. A predetermined energy dissipation profile is thus obtained based on the mesh densities of the piece forming this destructible bearing surface.

A limit stop of an actuator of an aircraft in accordance with the invention allows a stop without progressive wedging to be obtained, as opposed to an axial stop in the prior art with which a retrograde movement, which is sometimes impossible taking into account wedging, occurs after impact. In a limit stop in accordance with the invention, the lack of wedging is in particular ensured by the fact that each contact plane between the claw coupling teeth of the nut and the claw coupling teeth of the endless screw is radial. Another advantage of such a radial contact plane is that the axial component of the force generated upon impact is substantially zero, a low value which may possibly be produced in the case where the member causing the destruction of a destructible portion is at an angle with respect to the axis of the endless screw to orient the chosen direction or the deformation direction of the material during the absorption of the energy. Since the claw coupling teeth are distributed uniformly about the axis of the endless screw, the forces produced upon impact are exclusively formed of a torque, without a shear force component which would be detrimental for the mechanical behaviour of the actuator.

It goes without saying that the invention can cover numerous variant embodiments compared with the embodiments shown in the figures and described above. In particular, the destructible portions can be provided just as well at the nut bearing surface and the screw bearing surface or at both these bearing surfaces. Destructible portions can likewise be interposed between the two bearing surfaces of the limit stop in accordance with the invention. Each destructible portion can be destructible by plastic deformation and/or by breaking. Different modes of plastic deformation (with axial compression and/or with angular compression and/or under torsion and/or bending and/or traction . . . ) and/or different modes of breaking (by cutting, punching, shearing, penetration, deformation to breaking point under torsion and/or compression and/or bending and/or traction . . . ) can be envisaged, by using one (or more) destructible portion(s). The destructible portions can be destroyed under the effect of the relative rotational movement of the nut 15 and of the screw 14 (as in the illustrated embodiments, owing to claw coupling members). A single limit stop can comprise several nut bearing surfaces (which are e.g. concentric and/or angularly juxtaposed) and/or several screw bearing surfaces (which are e.g. concentric and/or angularly juxtaposed). A limit stop can comprise a single destructible portion or several destructible portions.

The invention also relates to any actuator of an aircraft other than a ball screw including: roller screw, screw with a trapezoidal screw pitch (in particular ACME), helical cylinder, and rotary cylinder.

The invention claimed is:

1. An actuator of an aircraft comprising:
   a driving member; and
   a driven member co-operating to form a guide for relative helical movement about an axis of the driven member with respect to the driving member,
   said actuator being provided with at least one limit stop having braking energy absorption comprising:
   at least one driving member bearing surface fixedly attached to the driving member in at least one rotational component of said relative movement, and
   at least one driven member bearing surface fixedly attached to the driven member in at least one rotational component of said relative movement,
   said driving member and driven member bearing surfaces being arranged to be able to co-operate by limit contact to form a device limiting the stroke of the driven member with respect to the driving member with braking energy absorption, each driven member bearing surface co-operating by contact with a driving member bearing surface in at least one radial contact plane, wherein:
   at least one limit stop: comprises at least one destructible portion which is able to, and is arranged to, be irreversibly deformed under the effect of the co-operation by limit contact of said driving member and driven member bearing surfaces, by relative rotation at the limit of said driving member and driven member bearing surfaces, is adapted such that the destruction of at least one destructible portion is visible from an exterior of the limit stop and of the actuator, each destructible portion is mounted to be removable with respect to the actuator so as to be able to be replaced,
   wherein at least one destructible bearing surface comprises at least one destructible portion adapted to be cut by at least one cutter fixedly attached to another bearing surface under the effect of a relative movement of the driven member with respect to the driving member and between these bearing surfaces upon co-operation by limit contact between the driving member and driven member bearing surfaces.

2. The actuator according to claim 1, wherein said at least one driving member bearing surface is a destructible bearing surface comprising at least one destructible portion which is removable with respect to the driving member bearing surface.

3. The actuator according to claim 2, wherein at least one driven member bearing surface is a destructible bearing surface comprising at least one destructible portion which is removable with respect to the driven member bearing surface.

4. The actuator according to claim 2, wherein at least one driving member bearing surface is a destructible bearing surface mounted to be removable with respect to the driving member.

5. The actuator according to claim 2, wherein at least one driven member bearing surface is a destructible bearing surface mounted to be removable with respect to the driven member.

6. The actuator according to claim 1, wherein said at least one driven member bearing surface is a destructible bearing surface comprising at least one destructible portion which is removable with respect to the driven member bearing surface.

7. The actuator according to claim 6, wherein at least one driving member bearing surface is a destructible bearing surface mounted to be removable with respect to the driving member.

8. The actuator according to claim 1, wherein at least one driving member bearing surface is a destructible bearing surface mounted to be removable with respect to the driving member.

9. The actuator according to claim 1, wherein at least one driven member bearing surface is a destructible bearing surface mounted to be removable with respect to the driven member.

10. The actuator according to claim 1, wherein at least one destructible portion is adapted to be plastically deformed under the effect of the co-operation by limit contact between said driven member and driving member bearing surfaces.

11. The actuator according to claim 1, wherein at least one destructible portion is adapted to be broken under the effect during the co-operation by limit contact between said driven member and driving member bearing surfaces.

12. The actuator according to claim 1, wherein at least one destructible portion is a rib arranged to be able to be shorn by a shearing cutter.

13. The actuator according to claim 1, wherein each driving member bearing surface is also fixedly attached to the driving member in a translational component of said relative movement, each driven member bearing surface is also fixedly attached to the driven member in a translational component of said relative movement.

14. The actuator according to claim 1, wherein the driving member is a screw and the driven member is a nut co-operating to form a guide for relative rotation and translation of the nut along the screw, and wherein at least one limit stop comprising at least one destructible portion comprises at least one screw bearing surface fixedly attached to the screw in at least one rotational component of said relative movement, and at least one nut bearing surface fixedly attached to the nut in at least one rotational component of said relative movement, said screw and nut bearing surfaces being arranged to be able to co-operate by limit contact to form a device limiting the stroke of the nut with respect to the screw with braking energy absorption.

15. The actuator according to claim 14, wherein the screw and the nut co-operate via a guide device selected from among balls, rollers and trapezoidal screw pitches.

16. The actuator according to claim 1, wherein each driven member bearing surface co-operates by contact with a driving member bearing surface in a plurality of contact planes uniformly distributed about the helical movement axis.

17. The actuator according to claim 1, wherein each limit stop comprises at least one destructible portion.

18. An aircraft comprising at least one actuator according to claim 1, wherein said at least one actuator is provided with at least one limit stop having braking energy absorption.

19. The aircraft according to claim 18, further comprising at least one control surface, wherein said at least one actuator is configured for actuating the control surface.

20. An actuator of an aircraft comprising:
   a driving member; and
   a driven member co-operating to form a guide for relative helical movement about an axis of the driven member with respect to the driving member,
   said actuator being provided with at least one limit stop having braking energy absorption comprising:

at least one driving member bearing surface fixedly attached to the driving member in at least one rotational component of said relative movement, and at least one driven member bearing surface fixedly attached to the driven member in at least one rotational component of said relative movement, said driving member and driven member bearing surfaces being arranged to be able to co-operate by limit contact to form a device limiting the stroke of the driven member with respect to the driving member with braking energy absorption, each driven member bearing surface co-operating by contact with a driving member bearing surface in at least one radial contact plane, wherein:

at least one limit stop: comprises at least one destructible portion which is able to, and is arranged to, be irreversibly deformed under the effect of the co-operation by limit contact of said driving member and driven member bearing surfaces, by relative rotation at the limit of said driving member and driven member bearing surfaces, is adapted such that the destruction of at least one destructible portion is visible from an exterior of the limit stop and of the actuator, each destructible portion is mounted to be removable with respect to the actuator so as to be able to be replaced, wherein at least one driving member bearing surface is a destructible bearing surface mounted to be removable with respect to the driving member.

21. An actuator of an aircraft comprising:

a driving member; and a driven member co-operating to form a guide for relative helical movement about an axis of the driven member with respect to the driving member, said actuator being provided with at least one limit stop having braking energy absorption comprising:

at least one driving member bearing surface fixedly attached to the driving member in at least one rotational component of said relative movement, and at least one driven member bearing surface fixedly attached to the driven member in at least one rotational component of said relative movement, said driving member and driven member bearing surfaces being arranged to be able to co-operate by limit contact to form a device limiting the stroke of the driven member with respect to the driving member with braking energy absorption, each driven member bearing surface co-operating by contact with a driving member bearing surface in at least one radial contact plane, wherein:

at least one limit stop: comprises at least one destructible portion which is able to, and is arranged to, be irreversibly deformed under the effect of the co-operation by limit contact of said driving member and driven member bearing surfaces, by relative rotation at the limit of said driving member and driven member bearing surfaces, is adapted such that the destruction of at least one destructible portion is visible from an exterior of the limit stop and of the actuator, each destructible portion is mounted to be removable with respect to the actuator so as to be able to be replaced, wherein at least one driven member bearing surface is a destructible bearing surface mounted to be removable with respect to the driven member.

* * * * *